United States Patent
Petitjean

(10) Patent No.: US 7,319,754 B2
(45) Date of Patent: Jan. 15, 2008

(54) INSERTION OF BINARY MESSAGES IN VIDEO PICTURES

(75) Inventor: Guillaume Petitjean, Trets (FR)

(73) Assignee: STMicroelectronics S.A., Montrouge (FR)

( * ) Notice: Subject to any disclaimer, the term of this patent is extended or adjusted under 35 U.S.C. 154(b) by 769 days.

(21) Appl. No.: 10/606,600

(22) Filed: Jun. 26, 2003

(65) Prior Publication Data

US 2004/0091108 A1 May 13, 2004

(30) Foreign Application Priority Data

Jun. 28, 2002 (FR) .................................. 02 08114

(51) Int. Cl.
*H04K 1/00* (2006.01)
(52) U.S. Cl. ........................ 380/210; 380/217
(58) Field of Classification Search ............... 380/210, 380/217
See application file for complete search history.

(56) References Cited

U.S. PATENT DOCUMENTS 5,715,005 A * 2/1998 Masaki .................. 375/240.16
5,960,081 A * 9/1999 Vynne et al. ............... 713/176
6,785,332 B1 * 8/2004 Kutter et al. ........... 375/240.16
6,895,118 B2 * 5/2005 Valente et al. ............... 382/232
2002/0007403 A1 1/2002 Echizen et al.
2002/0076083 A1 6/2002 Levy
2003/0206588 A1 * 11/2003 Etoh et al. ............. 375/240.13
2004/0236807 A1 * 11/2004 Hsiung et al. ............... 708/200

FOREIGN PATENT DOCUMENTS

EP 1 148 733 A2 10/2001

OTHER PUBLICATIONS

Bodo et al., "A scrambling method based on disturbance of motion vector", Dec. 2002, ACM, pp. 89-90.*
French Search Report from French Patent Application 02/08114, filed Jun. 28, 2002.

* cited by examiner

*Primary Examiner*—Matthew B Smithers
(74) *Attorney, Agent, or Firm*—Lisa K. Jorgenson; James H. Morris; Wolf, Greenfield & Sacks, P.C.

(57) ABSTRACT

A method and a circuit for marking with a binary code a video sequence compressed by motion calculation, from one picture to another, of macroblocks dividing each picture, the digital pictures being distributed in at least two categories according to whether they are coded integrally or by the motion vectors of the macroblocks with respect to the previous picture or to the previous and next pictures, which includes, at least for the pictures coded by motion vectors, only marking the macroblocks for which the motion vectors are greater than a predetermined threshold.

16 Claims, 2 Drawing Sheets

INSERTION OF BINARY MESSAGES IN VIDEO PICTURES

BACKGROUND OF THE INVENTION

1. Field of the Invention

The present invention relates to the insertion of codes or binary messages of identification or authentication in digital moving pictures and, more specifically, in moving pictures compressed by a motion calculation, area by area, from one picture to the other, for example, according to the Standard MPEG2, MPEG4, or H263.

2. Discussion of the Related Art

A first example of application relates to the insertion of an identifier or the person entitled to the rights relative to the video sequence to enable detection of a possible piracy by distribution of illicit copies. A second example of application is the protection against set-ups deforming or falsifying the pictures of video sequences, to ensure the integrity of a film. A third example is the insertion of rights relative to the use of the video sequences (number of copies or of possible uses).

The technique of binary code insertion in digital pictures is generally known as the "watermarking" and has had a recent expansion with the rapid development of digital picture transmission, especially over the Internet. Considering the increasing risk of illicit copies, the persons entitled to royalties, in particular, have searched for means to protect moving digital multimedia contents.

The three above examples concern so-called security applications. Non-security applications may also be found, for example, the inserting of characteristics linked to the shooting or other picture information.

Generally, the inserting of a code concerns each picture in the animated sequence, all pictures then comprising an insertion (for example, an identification code of the author is reproduced in all pictures). It is possible for the content of the respective codes to be linked to the picture sequence, to detect a possible parasitic picture insertion.

Whatever the application, a so-called marking algorithm is used to encrypt and position, in the pictures, the codes to be inserted therein. A reverse algorithm is used to restore, according to the application, the identification codes or the shooting characteristics, etc.

Many moving picture marking algorithms are known, for example, of standard ISO/IEC 13818-2 "Generic Coding of Moving Pictures and Associated Audio". The present invention does not relate to the actual marking algorithm and applies whatever the type of algorithm used.

The modification or coding often takes the form of an addition of a specific noise forming the hidden message. In the case of moving pictures to which the present invention applies, this noise addition results, especially if a marking robustness requiring stronger marking is desired, in a flickering of the pictures which is unacceptable in practice.

It could be devised not to mark all the pictures, to reduce the perception of the flickering by a human eye. However, such a solution would considerably weaken the marking, in particular to guarantee the picture sequence integrity.

SUMMARY OF THE INVENTION

The present invention aims at providing a novel solution for digitally marking pictures compressed by a motion calculation area by area from one picture to the other, and more specifically pictures coded according to standard MPEG2 (such as specified in the H262 recommendations in 1995 by "International Standard Tutorials"), video standard MPEG4, or H263.

The present invention especially aims at providing a solution which does not weaken the marking, in particular the video picture sequence integrity.

To achieve these and other objects, the present invention provides a method for marking with a binary code a video sequence compressed by motion calculation, from one picture to another, of macroblocks dividing each picture, the digital pictures being distributed in at least two categories according to whether they are coded integrally or by the motion vectors of the macroblocks with respect to the previous picture or to the previous and next pictures, which comprises, at least for the pictures coded by motion vectors, of only marking the macroblocks for which the motion vectors are greater than a predetermined threshold.

According to an embodiment of the present invention, all the macroblocks of the pictures of the first category are marked.

According to an embodiment of the present invention, for the pictures coded by motion vectors:

the motion vectors of the macroblocks of the current picture are calculated, the absolute value of the motion vectors is compared with a predetermined threshold; and according to whether the motion vector of a macroblock is or not greater than said threshold, the pixels of the macroblock are submitted or not to a marking algorithm.

According to an embodiment of the present invention, a prediction error of each macroblock is calculated, be it or not submitted to the marking algorithm, prior to an MPEG coding by discrete cosine transform.

According to an embodiment of the present invention, said threshold is selected to correspond to a motion greater than 5 pixels from one picture to the next one.

According to an embodiment of the present invention, the present invention is applied to a coding according to an MPEG standard.

The present invention also provides an MPEG coding circuit.

The foregoing objects, features and advantages of the present invention, will be discussed in detail in the following non-limiting description of specific embodiments in connection with the accompanying drawings.

DETAILED DESCRIPTION

Figures 1A, 1B:
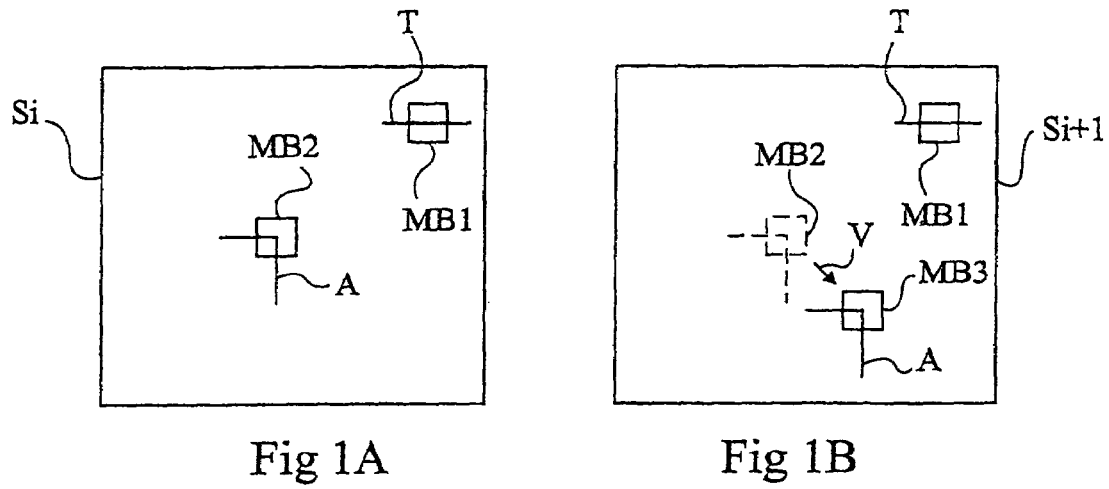
FIGS. 1A and 1B illustrate, in very simplified views of successive pictures of a video sequence, an implementation mode of the method according to the present invention.

For clarity, only those method steps and those system elements that are necessary to the understanding of the present invention have been shown in the drawings and will be described hereafter. In particular, the actual marking algorithms modify the picture sectors have not been described in detail. The present invention applies whatever the marking algorithm used. Further, the coding techniques according to standard MPEG2 are perfectly well known and have not been described in detail.

A feature of the present invention is to mark the pictures only in the regions which are modified from one picture to the next one. In other words, the present invention provides not marking the still areas of the pictures. Indeed, the most significant visual degradation is created in the still or slightly moving areas of moving sequences by the noise due to the addition of a marking.

Another feature of the present invention is to take advantage of the coding technique, for example, an MPEG technique, to detect the still and moving areas of the pictures. Indeed, the MPEG-type coding exploits motion vectors of blocks from one picture to the next one (or the preceding one) which enable making out the moving areas from the fixed areas. As is perfectly well known, the MPEG coding uses a division into pixel blocks of the picture to be coded. These pixel blocks are called macroblocks.

FIG. 1A illustrates in a simplified representation of two successive pictures $S_i$ and $S_{i+1}$ an implementation mode of the present invention.

In FIG. 1A, picture $S_i$ is assumed to be formed of a horizontal line T at least partially contained in a first macroblock B1 and of an angle pattern A at least partially contained in a second macroblock B2.

In the next picture ($S_{i+1}$), it is assumed that line T has not moved with respect to the preceding picture and that it is thus still contained in macroblock B1. However, angle A has changed place in the picture and is now contained in a macroblock B3.

In a simplified manner, the MPEG coding comprises of calculating, for the macroblocks of the next picture which are different with respect to the preceding picture, motion vectors V which then just have to be transmitted from a transmitter to a receiver for the latter to be able to restore picture Si+1 based on picture Si, at least for what concerns the moving block.

According to the present invention, block B1 of picture Si+1 will not be marked (coded by insertion of a binary message) to avoid any flickering in this fixed area of the picture. However, the coding will be applied to block B2 for which the noise is not visible by the eye due to the block motion between the two successive pictures.

Figure 2:
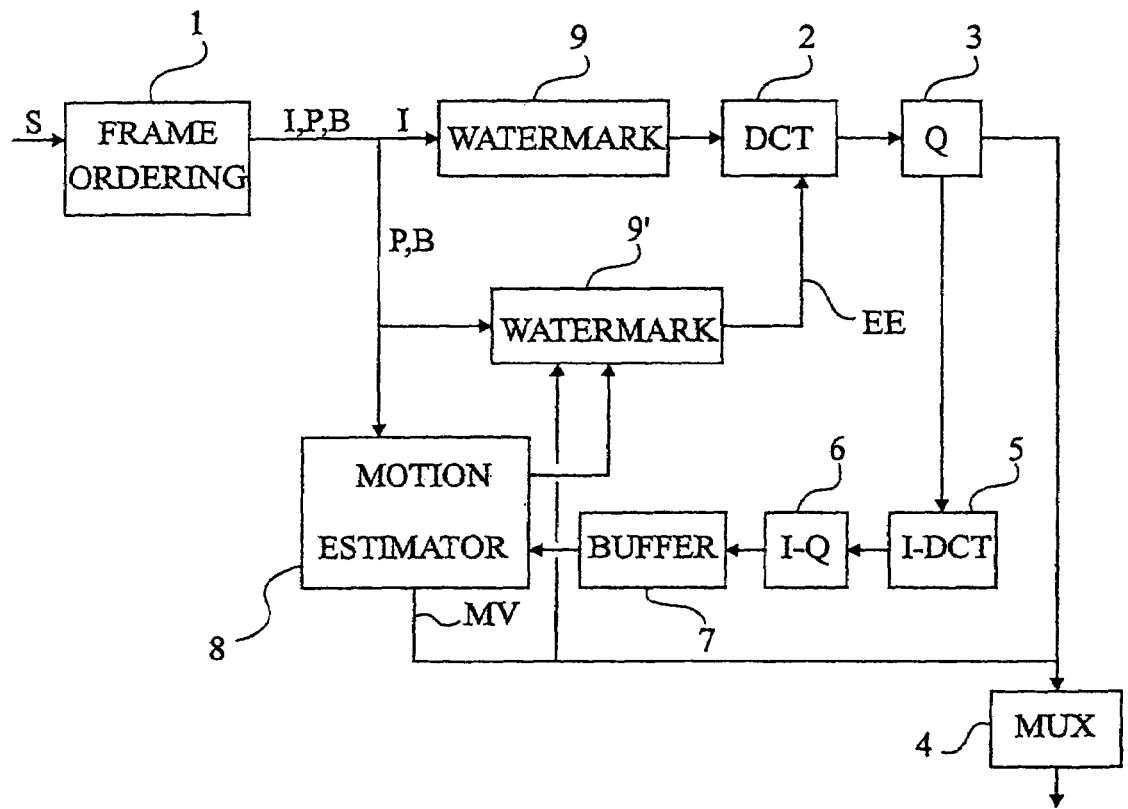
FIG. 2 shows an embodiment of an MPEG video coding device to implement the present invention.

FIG. 2 shows, in the form of blocks, an embodiment of an MPEG coding circuit adapted for the implementation of the present invention.

Conventionally, pictures S are first processed (block 1, FRAME ORDERING) to be distributed in three categories I, P, and B following a predefined so-called "group of pictures" order. A first category (I) is called "Intra" and corresponds to the pictures for which all of the information of the macroblocks forming them must be transmitted (pixel by pixel). The two other categories P and B are called "Previous" and "Bidirectional" and correspond to pictures having their macroblocks coded with reference to other pictures (previous for category P and previous and following for category B) in the video flow.

According to the present invention, the pictures are marked differently according to the category to which they belong.

Since I pictures are coded with no reference to the other pictures (which corresponds to a so-called JPEG coding), they are the less compressed by the transformation. According to a preferred embodiment of the present invention, all their pixels are marked, even those of still areas. Indeed, I pictures are generally very spaced apart in the video flow (there generally are only two pictures in one second of a video flow). Accordingly, the fact of also marking still areas poses no flickering problem (there is no succession of marked still areas in the display).

As concerns the P and B pictures which refer to the previous and possibly next images, only the picture macroblocks for which the motion vector standard is greater than a predetermined threshold are marked.

As illustrated in FIG. 2, the I pictures are marked by a process conventional per se (block 9, WATERMARK), then undergo a discrete cosine transform (block 2, DCT) followed by a quantization (block 3, Q) before being multiplexed (block 4, MUX) and written according to the proper syntax to form a flow or a file respecting the standard, for example, MPEG.

Conventionally, Intra pictures (and the Previous and Bidirectional pictures) may be used as a base for the coding (calculation of the motion vectors) of the other pictures. For this purpose, an output of block 3 is sent onto an inverse transform (block 5, I-DCT), then onto an inverse quantization (block 6, I-Q) to store (block 7, BUFFER) the coded picture upstream of a block 8 estimating the motion (MOTION ESTIMATOR) of the macroblocks of the other picture categories.

According to the embodiment shown in FIG. 2, it is provided to only mark the moving macroblocks of Previous pictures P and of Bidirectional pictures B. The motion vectors are calculated as in a conventional MPEG2 coder, the output of block 1 being connected to the input of block 8 for the P and B pictures. After these calculations, the considered macroblock is marked or not according to the value of the motion vector standard (block 9', WATERMARK), and this, before calculation of estimation error EE. Then, as in a conventional coder, the estimation error is calculated and the MPEG coding process carries on with no other modification.

According to the present invention, when a block has been marked by a binary message, it is not necessary to recalculate the motion vector (MOTION ESTIMATOR 8) since the addition of the binary code has not modified the scene motion. This is a significant advantage of the present invention since the motion vector calculation is one of the most complex steps of an MPEG coding. It is thus important not to have to repeat it. However, the prediction or estimation error EE, each macroblock of which is the difference between that of the current picture and the optimal macroblock calculated by means of the motion estimation in the reference picture, is recalculated. This error is then transferred to discrete cosine transform block 2 as in a conventional MPEG coding. The recalculation of the estimation error has not been shown in FIG. 2. This recalculation is performed between the output of block 9' and the input of block 2 (on link 10 from block 9' to block 2).

As an alternative, blocks 9 and 9' may be confounded in a single circuit shared by the respective paths of the I pictures and of the P and B pictures with appropriate sorting means.

In the case of a macroblock of a B picture which refers both to the previous picture and to the next picture, account is preferentially taken of the largest motion vector (in module) among that with respect to the previous picture and that with respect to the next picture.

Figure 3:
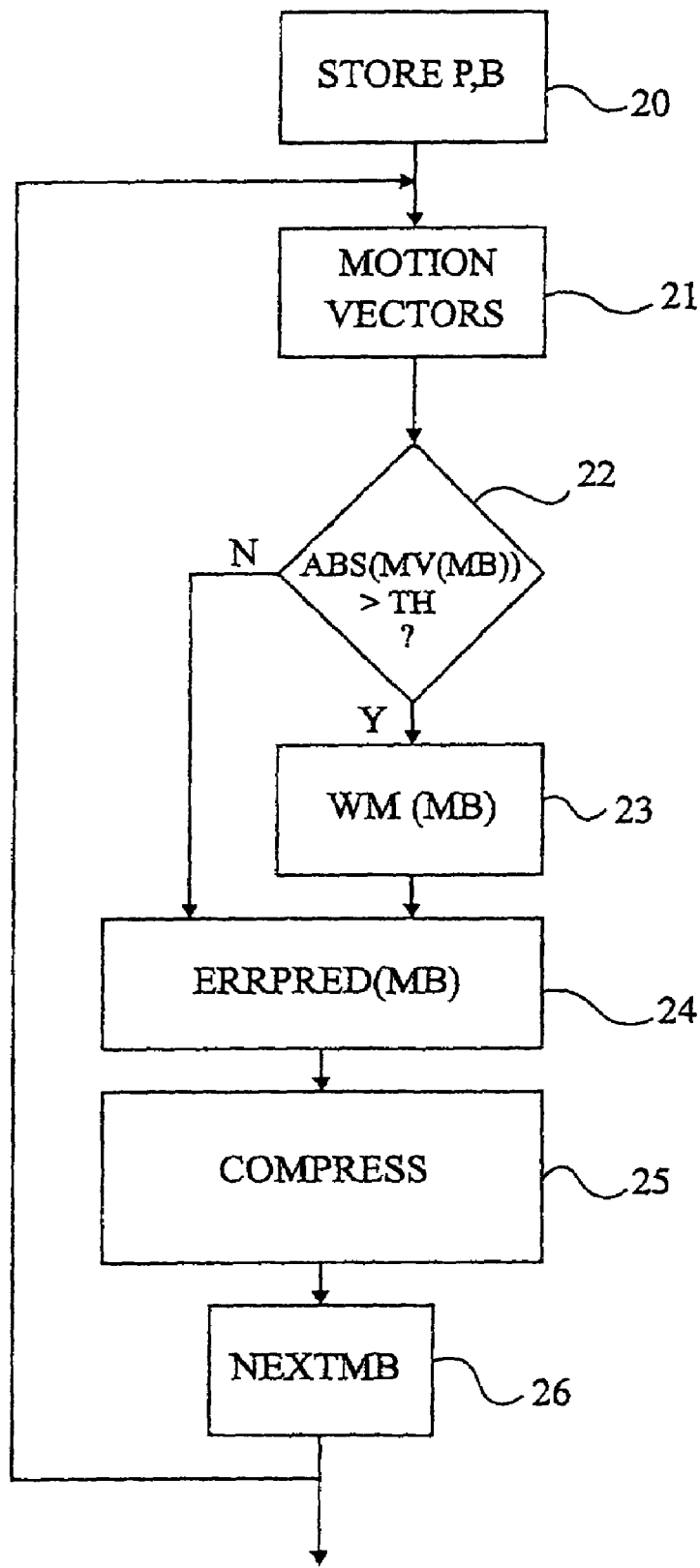
FIG. 3 is a simplified flowchart of an implementation mode of the binary message insertion method according to the present invention.

FIG. 3 illustrates in the form of a flowchart an implementation mode of the method according to the present invention for B- or P-type pictures. The P- and B-type pictures are first stored (block 20, STORE P, B). Then, the respective motion vectors MV of the macroblocks MB of these pictures are conventionally calculated (block 21, MOTION VECTOR).

The absolute value of the motion vector of each macroblock is then compared (block 22, ABS(MV(MB))>TH?) with a predetermined threshold TH to select those of the macroblocks which will be marked. The selected macroblocks are then submitted to the binary code insertion by means of a conventional algorithm (block 23, WM(MB)). Then, the prediction error is recalculated (block 24, ERRPRED(MB)) as with the macroblocks not selected on test 22. The obtained error is then conventionally processed by compression (block 25, COMPRESS). Finally, the next macroblock (block 26, NEXT MB) is selected and the calculation of its motion vector is resumed (block 21).

Once the picture is finished, it is proceeded to the next picture of the flow provided by block 1 (FIG. 2).

The above description of the method of the present invention is a functional description. In particular, different processings in parallel may be performed, provided that they are compatible with the conventional MPEG coding and decoding.

The reading of the marked information is performed at the MPEG decoding in a way similar to the coding process. The I pictures are conventionally decoded by an MPEG-compatible decoder and the marking is extracted from the entire pictures. As for the P and B pictures, they are decoded, but the marking is only read in the macroblocks having their motion vectors exceeding the predetermined threshold.

An advantage of the present invention is that it enables insertion of binary messages in a video picture sequence without for all this that they flicker and while inserting, preferentially, a marking in all the sequence pictures.

Another advantage of the present invention is that it is particularly simple to implement by taking advantage of the motion vectors calculated for the MPEG-coded pictures.

Of course, the present invention is likely to have various alterations, modifications, and improvement which will readily occur to those skilled in the art. In particular, it generally applies whatever the marking algorithm used.

Further, the implementation of the present invention by using conventional tools (hardware and/or software) is within the abilities of those skilled in the art based on the functional indications given hereabove.

Moreover, the setting of the threshold depends on the application and especially on the visual quality desired regarding the flickering. For example, threshold TH corresponds to a motion comprised between 5 and 15 pixels of the macroblock in the picture.

Finally, although the present invention has been described in relation with an MPEG coding, it more generally applies to any moving picture compression for which the pictures are distributed in at least two categories according to whether they are coded integrally or by motion vectors of areas of the current picture with respect to at least one previous picture or to the previous and next pictures.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for marking with a binary code a video sequence compressed by motion calculation, from one picture to another, of macroblocks that form each picture, the method comprising:
   receiving digital pictures of at least two categories, including a first category in which the digital pictures are coded integrally and a second category in which the digital pictures are coded by motion vectors of the macroblocks with respect to the previous picture or to the previous and next pictures; and
   marking, for the pictures of the second category coded by motion vectors, only the macroblocks for which the motion vectors are greater than a predetermined threshold.

2. The method of claim 1, comprising marking all the macroblocks of the pictures of the first category.

3. The method of claim 1, comprising, for the pictures coded by motion vectors:
   calculating the motion vectors of the macroblocks of the current picture,
   comparing the absolute value of the motion vectors with a predetermined threshold; and
   according to whether the motion vector of a macroblock is or not greater than said threshold, submitting or not the pixels of the macroblock to a marking algorithm.

4. The method of claim 3, wherein a prediction error of each macroblock is calculated, be it or not submitted to the marking algorithm, prior to a coding by discrete cosine transform.

5. The method of claim 1, wherein said threshold is selected to correspond to a motion greater than 5 pixels from one picture to the next one.

6. The method of claim 1, applied to a coding according to an MPEG standard.

7. An MPEG coding circuit, comprising means for implementing the method of claim 1.

8. A method of marking a video, the method comprising:
   receiving video motion information representing a change in position of a first image portion of the video;
   determining whether the change in position of the first image portion exceeds a threshold; and
   marking the first image portion of the video, if the change in position of the first image portion exceeds the threshold.

9. The method of claim 8, wherein marking the first image portion of the video comprises marking at least one pixel of the first image portion of the video.

10. The method of claim 8, wherein, prior to receiving the video motion information, the video has been compressed according to changes in positions of macroblocks of the video sequence to determine the video motion information, and further comprising:
    determining, for each of the macroblocks, whether a change in the position of each macroblock exceeds a threshold; and
    marking at least one of the macroblocks for which the change in position exceeds the threshold.

11. The method of claim 10, wherein the video motion information comprises motion vectors for the macroblocks, and further comprising:
    comparing an absolute value of the motion vectors with a threshold; and
    if the absolute value of the motion vector of a macroblock is greater than the threshold, submitting pixels of the macroblock to a marking algorithm.

12. The method of claim 10, further comprising:
    marking all the macroblocks for which the change in position exceeds the threshold.

13. The method of claim 8, wherein the threshold is selected to correspond to a change in position of the first image portion of at least 5 pixels from a first picture to a second picture of the video.

14. The method of claim 8, wherein the video has been compressed according to an MPEG standard to determine the video motion information.

15. A device for marking a video, the device comprising:
- a motion estimator that receives video motion information representing a change in position of a first image portion of the video and determines whether the change in position of the first image portion exceeds a threshold; and
- a first marking unit that marks the first image portion of the video, if the change in position of the first image portion exceeds the threshold.

16. The device of claim 15, wherein the first marking unit marks the first image portion of the video by altering at least one pixel of the first image portion of the video.

* * * * *

UNITED STATES PATENT AND TRADEMARK OFFICE
CERTIFICATE OF CORRECTION

PATENT NO. : 7,319,754 B2  Page 1 of 1
APPLICATION NO. : 10/606600
DATED : January 15, 2008
INVENTOR(S) : Guillaume Petitjean It is certified that error appears in the above-identified patent and that said Letters Patent is hereby corrected as shown below:

Col. 3, line 31 should read:
In a simplified manner, the MPEG coding comprises

Signed and Sealed this

Fourteenth Day of October, 2008

JON W. DUDAS
*Director of the United States Patent and Trademark Office*